United States Patent [19]
Asher

[11] Patent Number: 5,689,285
[45] Date of Patent: Nov. 18, 1997

[54] JOYSTICK WITH MEMBRANE SENSOR

[76] Inventor: David J. Asher, P.O. Box 8748, Albany, N.Y. 12208

[21] Appl. No.: 434,456

[22] Filed: May 2, 1995

Related U.S. Application Data

[63] Continuation of Ser. No. 120,723, Sep. 13, 1993, abandoned.

[51] Int. Cl.⁶ .................................................. G09G 5/08
[52] U.S. Cl. ..................... 345/161; 200/6 R; 74/471 XY
[58] Field of Search ........................... 345/161, 157, 345/156, 173, 174, 159; 200/6 A, 5 R, 17 R, 6 R; 273/148 B, DIG. 28; 74/471 XY; 463/38

[56] References Cited

U.S. PATENT DOCUMENTS

| | | | |
|---|---|---|---|
| 3,412,043 | 11/1968 | Gilliland | 252/514 |
| 4,138,369 | 2/1979 | Arai et al. | 252/512 |
| 4,246,452 | 1/1981 | Chandler | 200/5 A |
| 4,302,361 | 11/1981 | Kotani et al. | 252/503 |
| 4,313,113 | 1/1982 | Thornburg | 345/159 |
| 4,315,238 | 2/1982 | Eventoff | 338/99 |
| 4,349,708 | 9/1982 | Asher | 200/6 A |
| 4,488,017 | 12/1984 | Lee | 345/161 |
| 4,510,079 | 4/1985 | Kawai et al. | 252/511 |
| 4,587,039 | 5/1986 | Yamaoka et al. | 252/511 |
| 4,680,577 | 7/1987 | Straayer et al. | 340/711 |
| 4,736,191 | 4/1988 | Matzke et al. | 340/365 C |
| 4,745,301 | 5/1988 | Michalchik | 307/119 |
| 4,769,517 | 9/1988 | Swinney | 345/161 |
| 4,790,968 | 12/1988 | Ohkawa et al. | 264/104 |
| 4,856,993 | 8/1989 | Maness et al. | 433/68 |
| 4,879,556 | 11/1989 | Duimel | 341/20 |
| 5,012,231 | 4/1991 | Felsenstein | 345/161 |

OTHER PUBLICATIONS

"Touch–responsive devices enable new applications" EDN, Jan. 21, 1993, pp. 39–44.

*Primary Examiner*—Xiao Wu

[57] ABSTRACT

A joystick for generation of directional control signals for computers, video games, remote controllers, and other electronic devices and instrumentation. The present invention comprises a resistive membrane sensor and an actuator for coupling directional forces onto the membrane sensor. The resistive membrane sensor is comprised of two insulating substrates with resistor rings on each substrate, conductive leads, and a pressure-variable resistor. Increasing pressure on the actuator and membrane sensor decreases the resistance of the pressure-variable resistor in series with the resistor rings. An electronic circuit measures the membrane sensor and converts the resistances into the X and Y components of the force vector acting on the joystick. An alternative membrane sensor comprises a resistive ring, a conductive ring, and a pressure-variable resistor.

18 Claims, 10 Drawing Sheets

JOYSTICK WITH MEMBRANE SENSOR

This application is a continuation application based on prior application Ser. No. 08/120,723, filed on Sep. 13, 1993, now abandoned.

FIELD OF THE INVENTION

This invention relates to joystick devices for generating directional control signals for computers, video games, remote controllers, and other electronic devices and instrumentation. In particular, this invention relates to isometric joysticks and joystick controllers that provide continuous information about the position of the joystick or the force acting upon the joystick.

BACKGROUND OF THE INVENTION

Many joystick devices are well known in the art, and have been adapted in various ways to serve as controllers for computers, video games, remote controls, and other electronic devices.

The typical joystick used for these purposes has two rotary potentiometers coupled to a pivoted shaft, and is the common variety of joystick intended for use with the IBM-PC game port. Although these joysticks do provide continuous control and may even be adapted for return-to-center operation, they are bulky, require many components, have an intricate assembly process which increases cost, have moving mechanical parts that wear and decrease reliability, and are not adaptable for isometric operation.

The simplest type of joystick is described in U.S. Pat. No. 4,349,708 (Asher, 1982), employs a shafted actuator coupled to four switches. Although this type of joystick is quite common because of its simplicity, reliability, and low cost, it does not provide continuous control, merely a 1-of-4 direction indication.

U.S. Pat. No. 4,246,452 (Chandler, 1981) describes an improvement over simple four-switch joystick designs. By placing a plurality of switches on a membrane and covering the resulting membrane switch array with a circular actuator, much greater circular resolution may be achieved. The membrane results in lower cost, higher switch density over mechanical switches, and a slim profile. However, the angular resolution is limited in this approach to about 16 switches, and there is no pressure sensitivity for rate control.

Isometric joysticks detect the force acting on the joystick shaft using force sensors such as strain gauges. U.S. Pat. No. 4,680,577 (Straayer et al., 1987) describes such joystick devices in the context of a dual-use keyswitch and joystick. A variation on this device is the IBM TrackPoint isometric joystick, which is integrated into computer keyboards and uses three strain gauges to measure force. Although able to measure continuous force, the use of strain gauges is very expensive compared to simple resistor-based joysticks.

Another variation is the Interlink Electronics PortaPoint, which uses film-based pressure sensors to reduce costs significantly over strain gauges. These film-based pressure sensors are described in "Touch-responsive devices enable new applications", EDN, Jan. 21, 1993, pages 39–44. However, these devices produce several component signals which must be manipulated in order to provide simple X-Y signals, and at the minimum the sensor requires 5 connector leads.

Another approach to producing a slim design is capacitive sensing. U.S. Pat. No. 4,736,191 (Matzke et al., 1988) uses a capacitive touch panel to produce directional signals within a circular sensor area. This design is not amenable to use with an actuator, however.

U.S. Pat. No. 4,879,556 (Duimel, 1989) describes an inductive joystick device that does have a slim profile and an actuator, and provides continuous sensing. However, the inductive circuitry complicates the substrates and interface circuitry, so that there is no significant cost advantage over strain gauges.

The prevalence of portable computing devices and the advent of interactive television have created an acute need for cursor control devices that are very inexpensive, easily manufactured and integrated with keyswitches, and yet provide sufficient control for rapid and accurate cursor positioning, menu selection, and other control functions.

OBJECTS AND ADVANTAGES OF THE INVENTION

It is a principle object of this invention to provide a joystick controller for electronic devices that does not have moving mechanical parts, such as gears, rotary potentiometers, and optical encoders, and which may be constructed at very low cost and very high reliability. It is a principle object of this invention to further provide continuous, high-resolution information about the direction and magnitude of the force vector acting on the joystick shaft.

Further objects of this invention are to provide a joystick controller that may be designed either as an isometric joystick or that permits motion of the joystick shaft, and that may be integrated into a computer keyboard or other keyswitch panel with minimal component cost and assembly time. It is an object of this invention to provide a joystick that integrates a keyswitch within the joystick so that a single device may serve as a keyswitch and a joystick, saving space and cost.

It is also an object of this invention to provide an electronic interface between the joystick and the electronic device to be controlled, the electronic interface being simple and low cost, yet maintaining high resolution and a wide range of force sensitivity. It is an object of this invention that the physical interface (i.e. connector) to the sensor and the signals produced by the electronic interface circuit be as simple and straightforward as possible.

The present invention employs a membrane sensor to reduce cost and improve reliability, and employs an actuator that transfers the force vector that the user imparts to the joystick shaft onto the membrane sensor. The membrane sensor uses a resistive ink pattern with a pressure-variable resistor to provide signals representative of the direction and magnitude of the force vector. The actuator is typically a single-piece molded component, possibly including a spring or elastomeric element to tailor the force response.

Typically, what is desired as output is an X-Y data pair which represent the sine and cosine components of the force vector, scaled by the magnitude of the force. This data format is directly useful, for example, in controlling the velocity of a cursor on a computer screen, while modulating the cursor speed with force. The electrical interface of the present invention provides this data format with simple, low-cost components.

The present invention has the advantage over joysticks known in the prior an of reliability due to simple mechanical construction, having two or three simple and reliable components, without having moving components that exhibit frictional wear, or that require an intricate process for assembly. This simple construction is low-cost because: the actuator is easily fabricated from injection-molded plastic; the membrane sensor may be manufactured using screen-printing production on polyester substrates; and the assembly process is simple and easily automated.

The present invention has a significant cost/performance advantage over other joystick technologies known in the art. The present invention may be constructed using a slim housing and a button actuator, making a low-profile joystick possible. The present invention may be implemented either as an isometric joystick (i.e. measuring force without requiting motion of the joystick shaft), or may permit motion of the shaft. The present invention provides a center position which is stable, predicable, and repeatable, unlike rotary potentiometer joysticks which the user must calibrate before use.

The present invention has an overwhelming advantage over nearly all pointing device technologies when integrated into a computer keyboard. In high-volume manufacture, the membrane sensor of the present invention may be printed directly on the keyswitch membrane, and the actuator may be molded and assembled in the same process as the keycaps, effectively eliminating any physical component costs for the pointing device except for an additional print pass required for the resistor ink. In other membrane keyswitch applications, such as video game controllers, remote controllers, and palmtop computer pointing devices, the present invention may be similarly integrated into the product with almost inconsequential cost increases.

The present invention also provides for a simple electronic interface. Many computer, consumer, and industrial applications will require a joystick controller that is very low cost. Many analog input devices require analog-to-digital conversion processes that are prohibitively expensive for such applications. The present invention employs a simple interface that both measures the membrane sensor and then converts these analog signals into a format which is easily interfaced to microcontrollers, resulting in a low-cost joystick device that is cost-competitive with other joystick and mouse technologies, and yet provides significant advantages in performance and system integration costs.

SUMMARY OF THE INVENTION

In its most general form, the present invention is a joystick that comprises a membrane sensor mechanically coupled to an actuator, for producing directional control signals that are representative of the force vector applied to the actuator.

The membrane sensor is comprised of two substrates with a resistor ring deposited on each substrate and conductive leads connecting the resistor rings to external circuitry. A pressure-variable resistance between the resistor rings produces a modulation in the control signals which is proportional to the force applied to the actuator. A variation on this membrane sensor has centering resistors deposited on each substrate, and which are electrically connected in parallel with each resistor ring.

An alternate membrane sensor is comprised of two substrates, with a resistor ring deposited on one substrate, a common conductor ring deposited on the opposing substrate, and conductive leads connecting the resistor ring and common conductor ring to external circuitry. A pressure-variable resistance between the resistor ring and the common conductor ring produces a modulation in the control signals which is proportional to the force applied to the actuator. A variation on this membrane sensor has a keyswitch integrated into the center of the sensor.

DETAILED DESCRIPTION OF THE INVENTION

Figure 1:
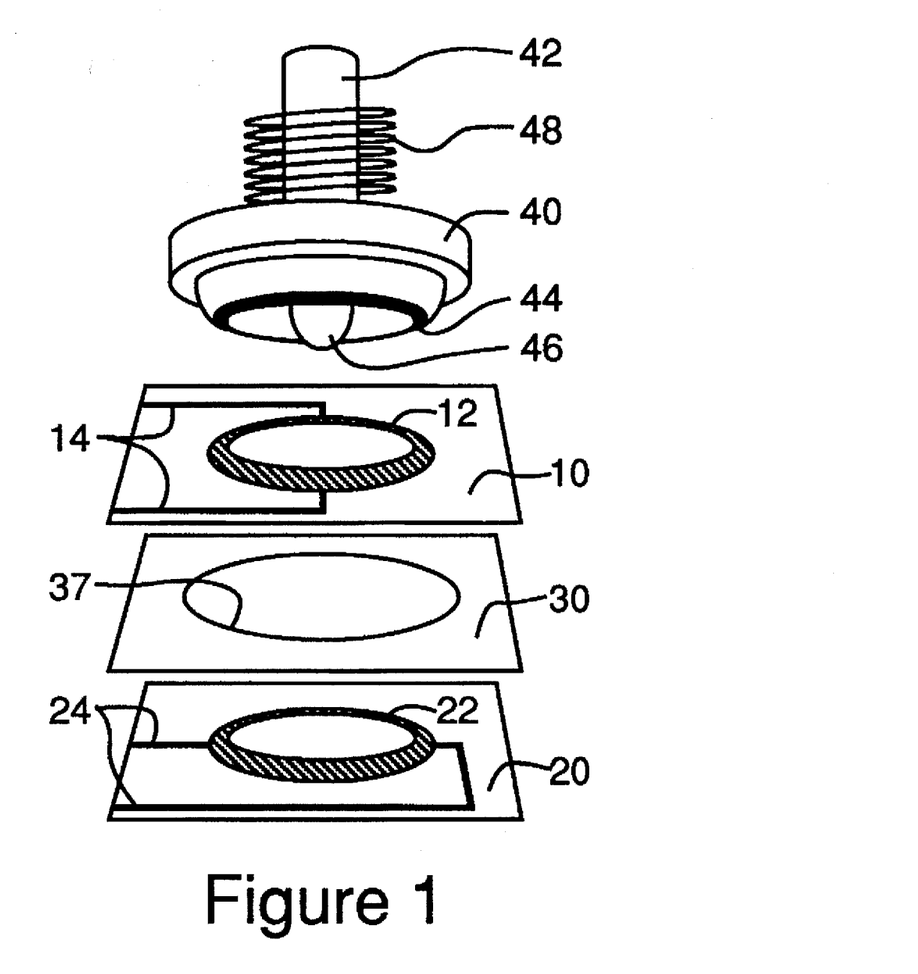
FIG. 1 shows an exploded view of a preferred embodiment of the present, with the primary components being the actuator and membrane sensor.

FIG. 1 shows an exploded view of a preferred embodiment of the present invention. A resistor membrane sensor is constructed of two substrates 10 and 20, with the top substrate being deformable. Two rings of resistor material 12 and 22 are deposited on the substrates. Two conductive leads 14 attach to opposite sides of resistor ring 12, and two conductive leads 24 attach to opposite sides of resistor ring 22. The resistor rings and conductive leads are oriented in a 90° relationship in order to define orthogonal X and Y signal dimensions. Spacer substrate 30 has an aperture 37 to permit the resistor rings to make contact, while providing insulation between the conductive leads and providing a minimum threshold force for actuation.

An actuator 40 is mechanically coupled to the membrane sensor. A pivot point 46 allows the actuator to be rocked about its central axis when the actuator shaft 42 is tilted. The actuator shaft 42 forms the familiar "joystick", and could be implemented as a stick, button, knob, keycap, or another shape. The preferred shape will depend upon the application in which the present invention will be used. The tilt applied to the actuator might in fact be a negligible mount; an isometric joystick would allow little motion of the actuator, while measuring the forces exerted against it.

Tilting the actuator about the pivot point 46 causes actuation ring 44 to contact the membrane sensor in the direction of the tilt. A greater force applied to the actuator will increase the pressure between the resistor rings 12 and 22, decreasing the resistance between them at the point of contact. The actuation ring 44 will typically be an elastomeric material in order to provide a more comfortable feel to the actuator and a greater range of response to force. Actuation ring 44 may also be a stiff material such as molded plastic, with an elastomeric cushioning material between it and the membrane sensor, such as a thin sheet of neoprene or silicon rubber.

Typically, the present invention will be implemented as a return-to-center joystick. In this case, when no external forces are applied, the actuator shaft returns to its center position, at 90° to the plane of the membrane sensor. This centered condition relieves pressure between the resistor rings, and the joystick outputs a zero, centered, or invalid signal. A restoring spring 48 returns the actuator to its center position, and may be implemented in many ways, such as a coiled spring, a stamped or molded spring, or an elastomeric material, and may be placed above or below the actuator. The pivot point 46 is preferred for ensuring that only a single point of contact results when the actuator is engaged, although this will not be necessary in all implementations.

Figure 2:
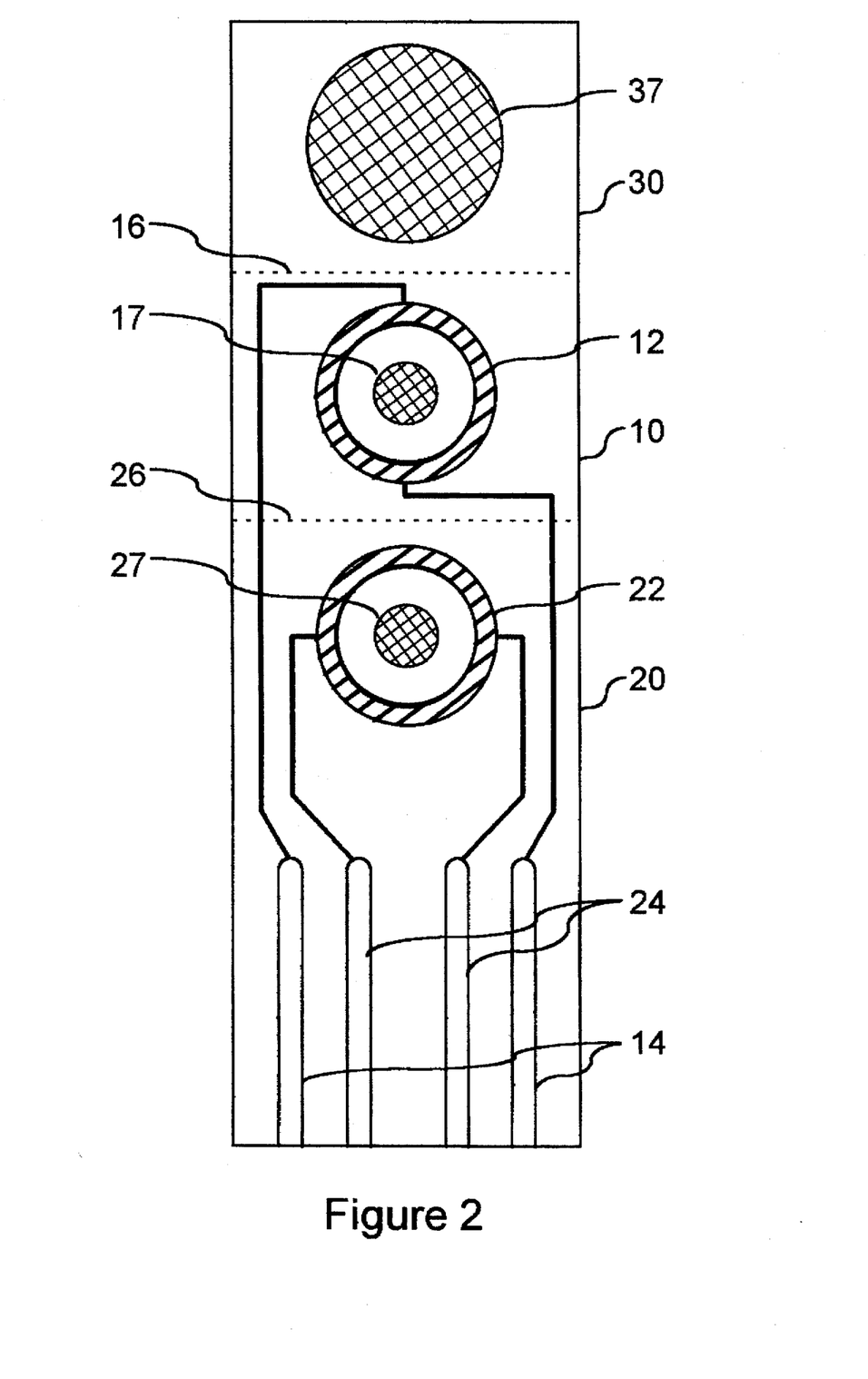
FIG. 2 shows an embodiment of the membrane sensor, having an X resistor ring and a Y resistor ring on opposing substrates.

FIG. 2 shows a detailed view of a preferred embodiment of the membrane sensor, which is one of many possible designs. The membrane sensor may be implemented as a single sheet with a fold-over design as shown in FIG. 2, or the various substrates may be separate overlaying sheets. In this case, a single film is used to form the various substrates, typically a polyester film, but other materials may be used, such as polyamide films, or FR4 circuit board material. The substrates may be formed from separate or dissimilar materials. A preferred film for the substrate is ICI Melinex ST507 heat-stabilized polyester, which is commonly used in the membrane switch industry.

The resistor substrates 10 and 20 are defined by perforation cuts 16 and 26, and the sensor is assembled by folding along these perforations. Substrate 30 is a mechanical spacer layer which serves to create a threshold force below which the sensor will not respond, which is a similar structure to membrane switches, and also serves to insulate the conductive leads on substrate 10 from those on substrate 20. Aperture 37 is cut from the substrate spacer layer 30. The central regions 17 and 27 may also be cut from the center of the sensor to form apertures that allow the actuator pivot point 46 to pass through it, to allow a keyswitch to be superimposed with the joystick, or simply to act as a registration guide. The apertures and perforations may be die-cut for large volume manufacture, or hand-cut for small volumes.

Conductive leads 14 and 24 are deposited onto the film. A typical process is screen printing using thick film inks, but the conductive traces may also be deposited using other methods such as thin film chemical vapor deposition or etching of laminated flex-circuit or rigid PCB material. Suitable inks for this purpose include Acheson Colloids 461SS Screenable Silver Ink and Minico M-4200 Polymer Silver Conductor, which are applied using screen printing techniques and then thermal cured. These inks also have the ability to be creased along the perforations, which allows this sensor design to be constructed from a single sheet having all traces terminate on the same connector tab.

Resistors 12 and 22 are deposited onto the film, making contact with the conductive leads, and are typically applied using thick film inks, but may also be applied with other methods. A suitable ink for this purpose is the two-part Acheson Colloids 423SS and SS24210, which is applied using screen printing and then thermal cured, and the combination may be mixed and screened to achieve a wide range of resistor values. Also Minico M-3000 series Flexible Carbon Resistors may be used, which are sold in a range of resistance values. Desirable resistance values, as measure from the conductive leads, will fall in the 100K to 1M range, but lower or higher values may be used successfully.

It is preferred that there be a pressure-variable resistance between resistor rings 12 and 22, in order to allow greater forces on the actuator to result in control signals that indicate the magnitude of actuation as well as direction. There are several methods for achieving pressure-sensitivity between the resistors.

A simple method for pressure-sensitivity involves increasing the area of contact between the two resistor rings as the actuation force increases. A typical implementation of this approach uses an elastomeric actuator, so that the actuator deforms with increasing applied force, increasing its area of contact with the membrane sensor. The drawback of this technique is that the range of effect is very limited. The range may be extended by adding a mechanical retarding force which acts against the actuator. This may be achieved by printing small insulating dots over the surface of the resistor rings, although the range of effect will still not be very great. Suitable inks for forming such insulating dots include Acheson Colloids SS24112 and Minico M-7800, which are flexible dielectric inks that are screen printed and thermal cured.

Improved approaches for achieving pressure variability include: (1) modify the material of the resistor rings to attain force variability as well as area variability, (2) top-coat the resistor rings for the same effect, or (3) add a sheet material between the resistor rings that changes resistance with applied pressure.

Various pressure-sensitive resistor inks, coatings, and sheet materials are known in the art, including: U.S. Pat. No. 4,745,301 (Michalchik); U.S. Pat. No. 4,790,968 (Ohkawa et al.); U.S. Pat. No. 4,315,238 (Eventoff); U.S. Pat. No. 4,856,993 (Maness et al.), U.S. Pat. No. 4,510,079 (Kawai et al), U.S. Pat. No. 4,587,039 (Yamaoka et al), U.S. Pat. No. 3,412,043 (Gilliland), U.S. Pat. No. 4,138,369 (Arai et al), and U.S. Pat. No. 4,302,361 (Kotani et al), which are hereby incorporated by reference.

Some of these methods may produce a single material that exhibits both a fixed resistance parallel to the resistor plane, and a pressure-variable resistance perpendicular to the resistor plane. Some of the materials will have a very high resistance parallel to the resistor plane, and will only be useful as a top-coat. Using a top-coat allows more flexibility in setting the fixed resistor ring value independently of the pressure-variable resistor value, although this requires an extra print pass, adding to the manufactured cost.

Figure 3:
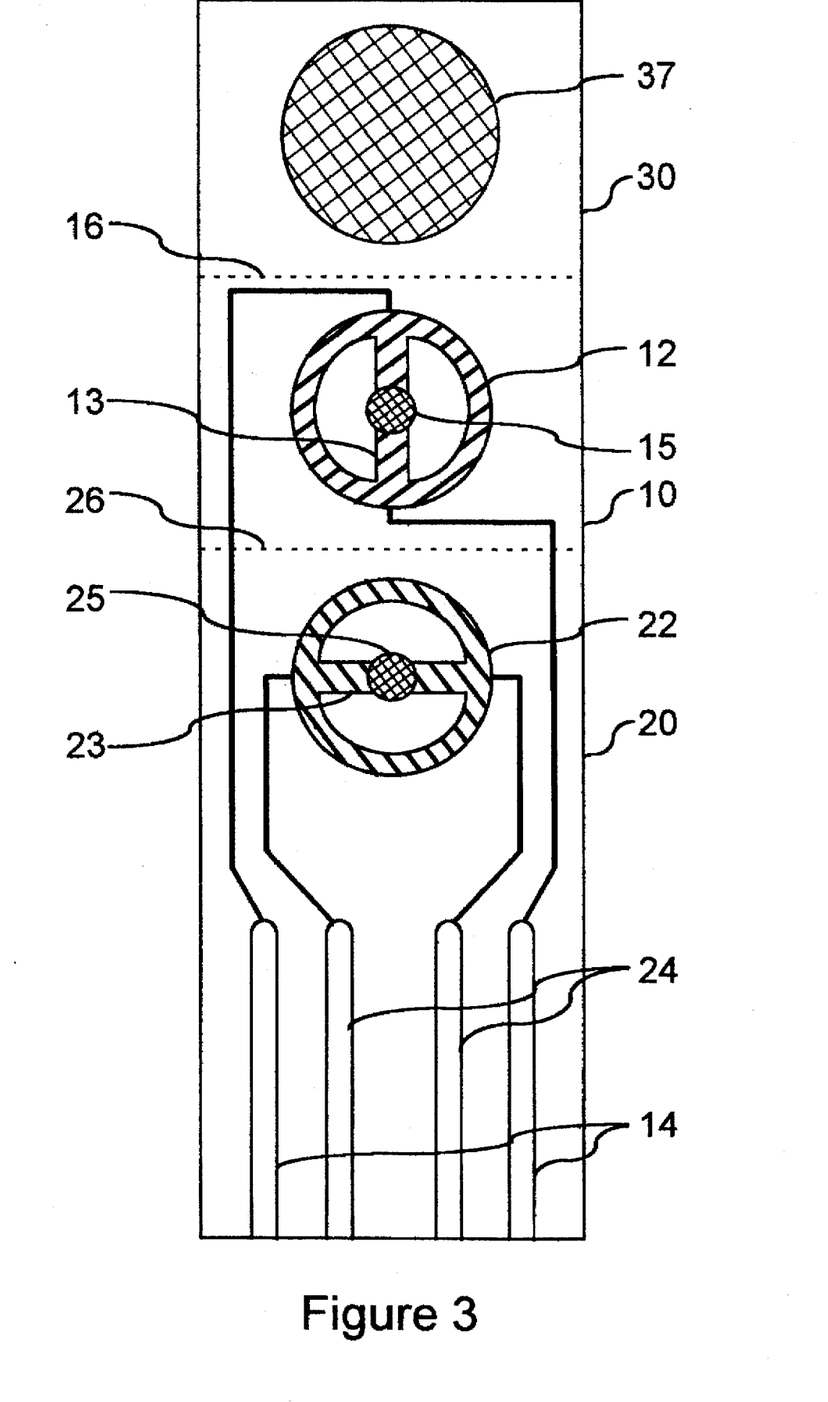
FIG. 3 shows a modified version of the membrane sensor in FIG. 2, having centering resistors for ensuring that a valid signal is always produced.

FIG. 3 shows a detailed view of a second embodiment of the membrane sensor, having centering resistors 13 and 23. These resistors may be printed from the same material as the resistor rings 12 and 22, although they need not be pressure-sensitive. Contacting the centering resistors 13 and 23 is conductive spots 15 and 25, respectively.

Using this sensor, the actuator should not pierce the sensor, rather the actuator pivot point 46 should cause conductive spots 15 and 25 to make contact with each other. The advantage of this sensor is that even when no force is acting upon the actuator, the sensor will report a valid signal. If the actuator does not engage the membrane sensor unless pressed, the contact between centering resistors 13 and 23 may also be used to detect a keyswitch closure.

Figure 4:
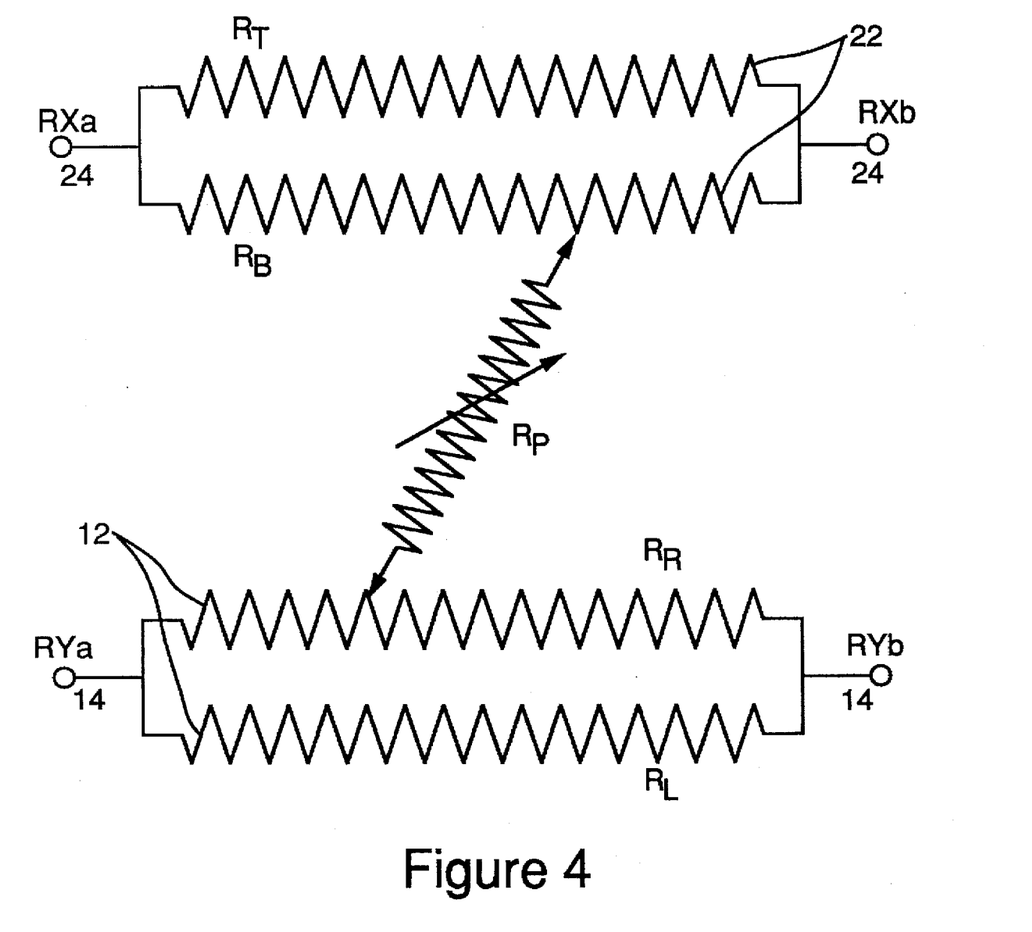
FIG. 4 shows a schematic representation of the sensor in FIG. 2.

FIG. 4 shows a schematic representation of the sensor in FIG. 2. Resistor ring 12 is divided into left and right resistors, $R_L$ and $R_R$, due to the placement of conductive leads 14. Similarly, resistor ring 22 is divided into top and bottom resistors, $R_T$ and $R_B$, due to the placement of conductive leads 24. When the actuator is engaged, either $R_L$ or $R_R$ will be electrically connected to either of $R_T$ or $R_B$, through the pressure-variable resistor $R_P$. The division of $R_L$ or $R_R$ at the point of contact may be used to determine the Y or vertical direction component, and the division of $R_T$ or $R_B$ at the point of contact may be used to determine the X or horizontal direction component. The pressure-variable resistor may then be used to determine the magnitude of the force vector engaging the actuator in that direction.

Figure 5:
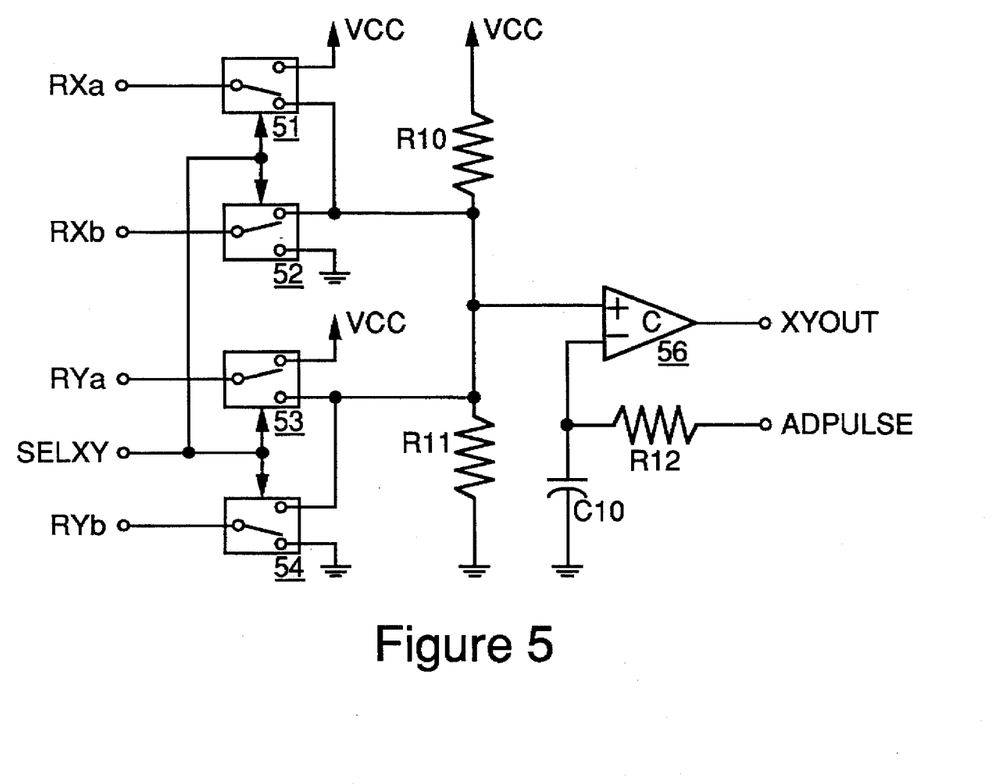
FIG. 5 shows a measurement circuit that may be used to interface the sensor of FIG. 2 or of FIG. 3 to a microcontroller or other instrumentation.

FIG. 5 shows an electronic measurement circuit that may be used to interface the membrane sensor of FIGS. 2 and 3 to a microcontroller or other instrumentation. The four sensor terminals are labelled RXa and RXb for the horizontal (X) components of resistor 22 and conductive leads 24, and RYa and RYb for the vertical (Y) components of resistor 12 and conductive leads 14. Four analog multiplexers, 51 through 54, are used to switch between an X measurement phase and a Y measurement phase. The analog multiplexers may be implemented by industry standard CMOS components such as CD4066 or CD4053. The measurement phase is determined by discrete input signal SELXY, which changes the selection state of the analog multiplexers.

The principle of operation for the circuit of FIG. 5 is a passive voltage divider. The state as shown is the Y measurement phase. The Y sensor components ($R_L$ and $R_R$) are connected to ground and Vcc (typically 5 volts), creating a voltage divider across resistor ring 12. The two X sensor components ($R_T$ and $R_B$) are wired in parallel and connected to resistor divider chain R10 and R11, which have equal values and so set the center output at ½ Vcc. The value of R10 and R11 relative to the resistor ring values and the pressure-variable resistor will determine the full-scale swing of the output signal (Y in this case), as well as the response curve to applied pressure. Resistors R10 and R11 are not required for the sensor of FIG. 3 since they are effectively replaced by center resistors 13 and 23.

The center value of ½ Vcc at the non-inverting (+) input of comparator 56 represents a minimum force value, with the voltage increasing towards Vcc as the actuator is pushed right, and decreasing towards ground as the actuator is pushed left. A similar measurement sequence occurs for the X measurement phase. Since resistors R10 and R11 serve to provide the center voltage of ½ Vcc when the actuator is not engaged, this circuit never exhibits a degenerate joystick position signal. Comparator 56 may be implemented with part LM339 or similar devices.

Comparator 56 with R12 and C10 form a simple and inexpensive analog-to-digital converter suitable for use with a wide variety of microcontrollers, especially those containing timers that are suitable for measuring pulse widths. The discrete input signal ADPULSE is a square wave, which produces an alternating rising and falling exponential curve at the inverting input (−) of comparator 56. The timing of this RC circuit relative to the values of R12 and C10 will determine how nonlinear this exponential appears. When the membrane sensor output is centered, the difference between the pulse width for the rising and falling portions of the conversion cycle should be zero. This difference will go positive when the sensor measurement voltage increases (i.e. the actuator force is to the right), and will go negative when the sensor measurement voltage decreases (i.e. the force is to the left).

Figure 6:
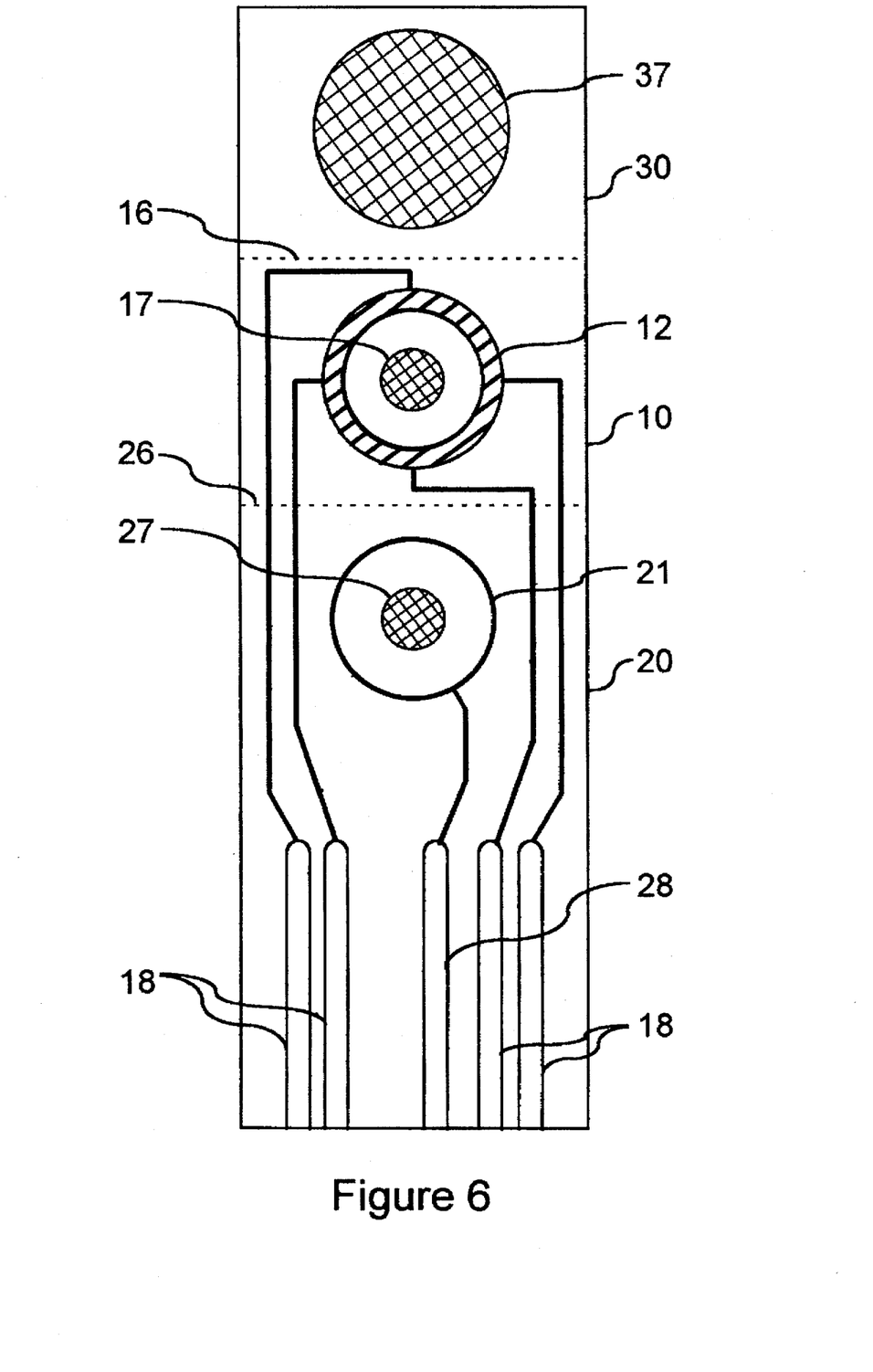
FIG. 6 shows an embodiment of the membrane sensor, having an X-Y resistor ring on one substrate and a common conductor ring on the opposing substrate.

FIG. 6 shows another embodiment of the resistive membrane sensor. A single resistor ring 12 is deposited on substrate 10. Four conductive traces 18 contact the resistor ring at its top, bottom, left and right, which will supply the directional signals. A conductive ring 21 supplies a source current into the resistor ring 12 when pressure is applied, and is connected to conductive lead 28. In order to create a pressure variable resistance between the resistor ring 12 and the conductive ring 21, the previously described methods may be used, including top-coating the conductive ring 21.

Figure 7:
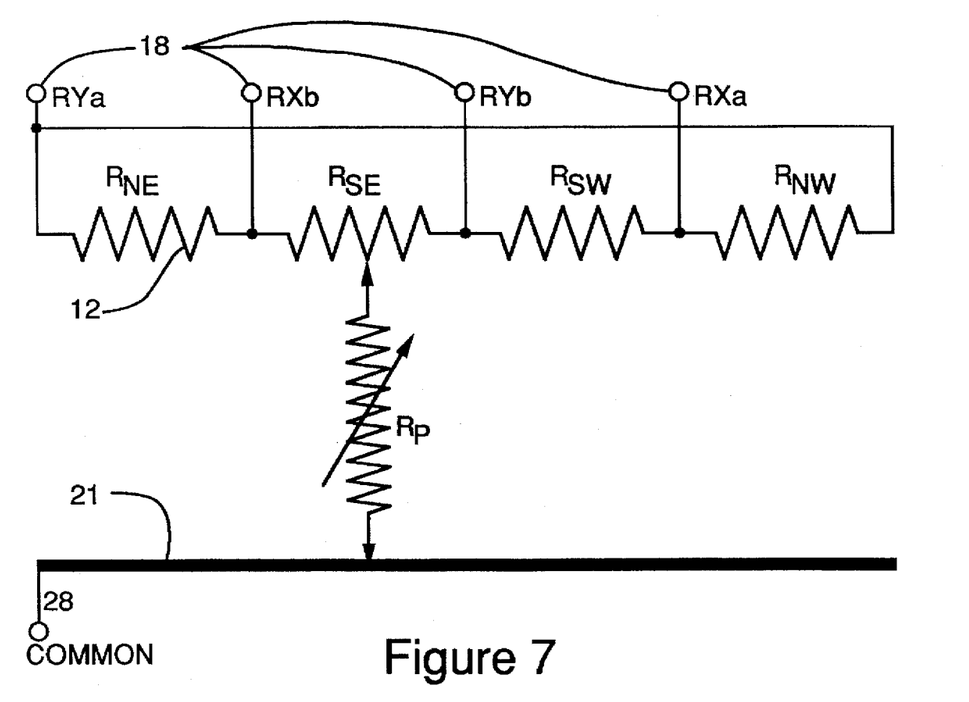
FIG. 7 shows a schematic representation of the sensor in FIG. 6.

FIG. 7 shows a schematic representation of the sensor in FIG. 6. Resistor ring 12 is divided into four resistors, $R_{NE}$, $R_{SE}$, $R_{SW}$, and $R_{NW}$, referring to the north-east, south-east, south-west, and north-west resistor quadrants created by conductive leads 18. The conductive ring 21 becomes electrically connected to the resistor ring 12 at the point of contact through the pressure-variable resistor $R_P$.

Figure 8:
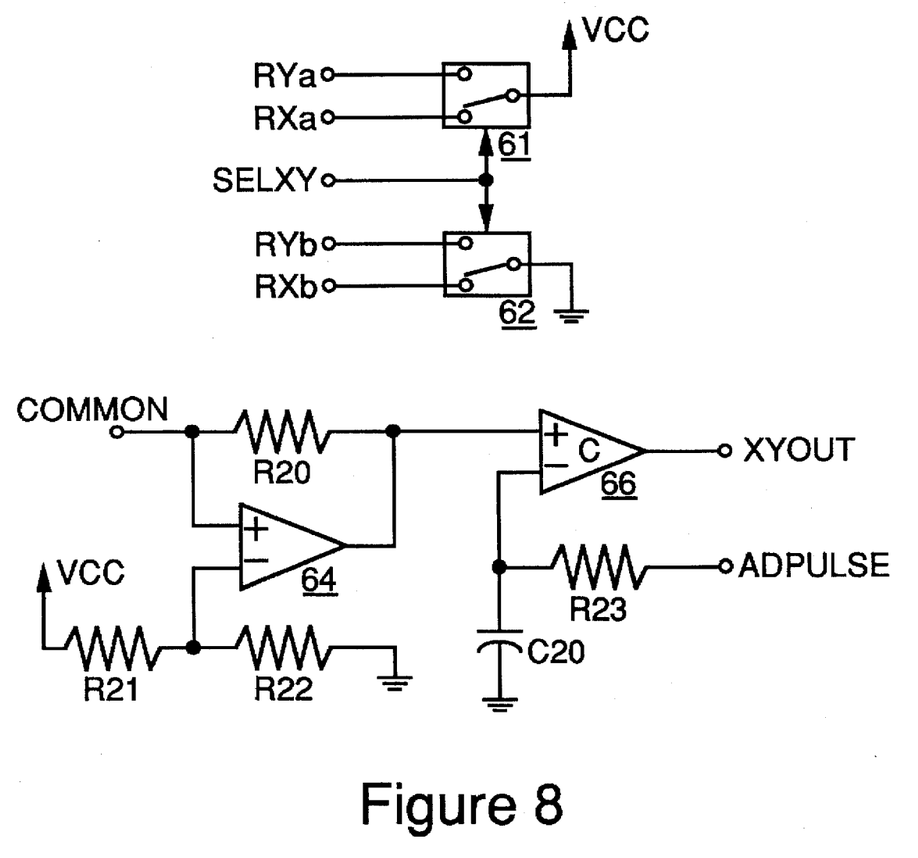
FIG. 8 shows a measurement circuit that may be used to interface the sensor of FIG. 6 to a microcontroller or other instrumentation.

FIG. 8 shows an electronic measurement circuit that may be used to interface the membrane sensor of FIG. 6 to a microcontroller or other instrumentation. The four sensor terminals connected to the resistor ring 12 are labelled RXa, RXb, RYa and RYb. A fifth terminal connected to conductor ring 21 is labelled $R_P$, and is electrically connected to the resistor ring 12 through the pressure-variable resistor. Two analog multiplexers, 61 and 62, are used to switch between an X measurement phase and a Y measurement phase, which is determined by discrete input signal SELXY.

For the X measurement phase, as shown in FIG. 8, the resistor ring is connected to Vcc and ground, setting up a voltage divider. Rather than a passive measurement resistor network, this circuit uses an operational amplifier to increase the gain of the direction signal and reshape the response curve.

With the sensor's resistors at the input side of an inverting amplifier, the pressure response is proportional to (½ Vcc) $\times[1+R20/(R_{SE}+R_P)]$. The inverse relationship to $R_P$ creates an expanded pressure curve and greater dynamic range from the sensor, with the gain set by R20, and $R_{SE}=R_{NE}=R_{SW}=R_{NW}$. An RC circuit with comparator 66 provides a simple microcontroller interface. OpAmp 64 may be implemented with an LM324 or similar device.

Figure 9:
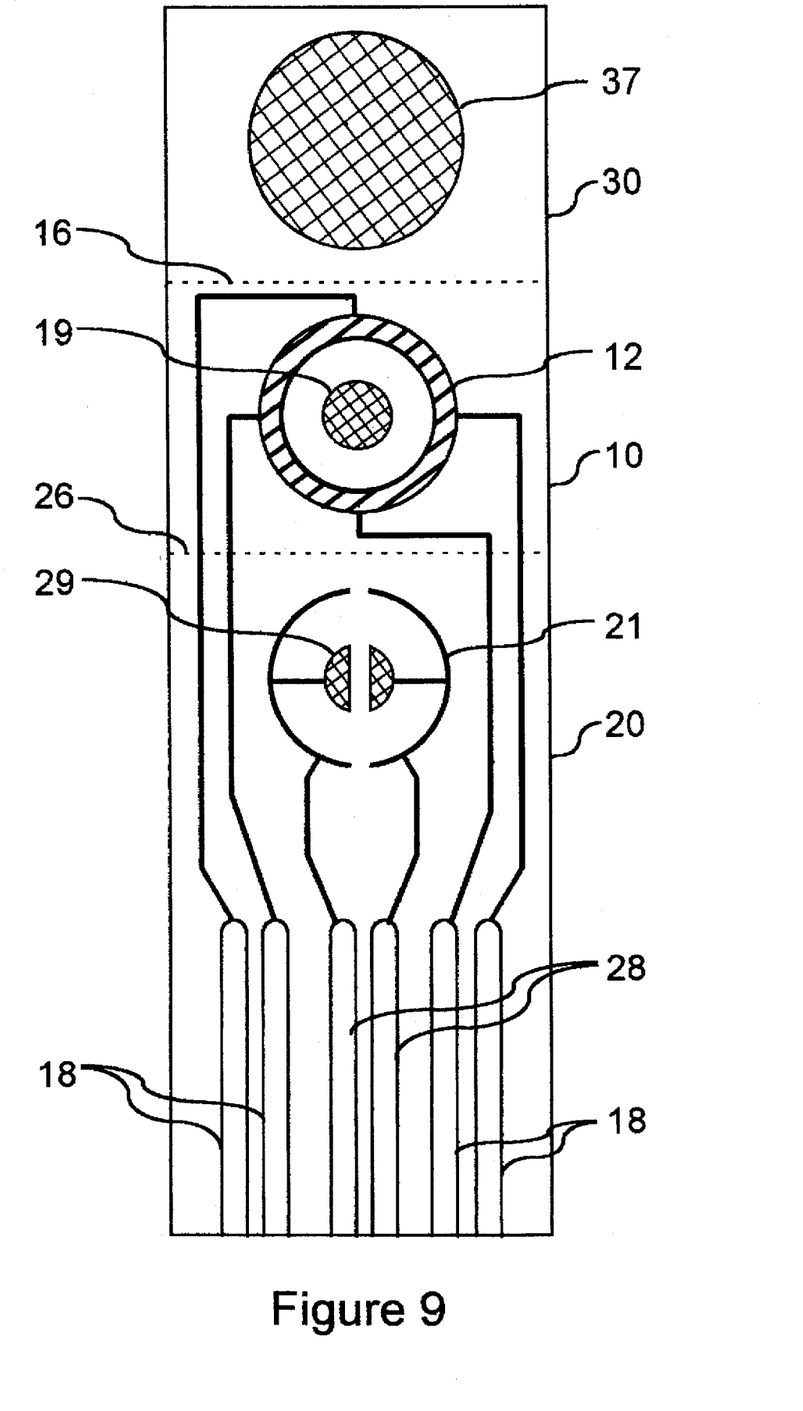
FIG. 9 shows a modified version of the membrane sensor in FIG. 6, having an integrated keyswitch centered in the sensor.

FIG. 9 shows another embodiment of the resistive membrane sensor, which is a variation of the sensor in FIG. 6 and integrates a keyswitch within the membrane sensor. A common application of this sensor would be to implement a computer keyboard where one of the alphanumeric keys serves a double function as a joystick pointing device.

Conductive ring 21 is divided into two halves to accommodate the two poles 29 of a keyswitch placed in the center of the sensor. Conductive spot 19 contacts the keyswitch poles 29 when pressure is applied to the center of the membrane sensor—in this case the pivot point of an actuator would only contact the membrane sensor when the actuator is depressed. When the center keyswitch is closed, both halves of conductive ring 21 will be at the same electrical potential.

Figure 10:
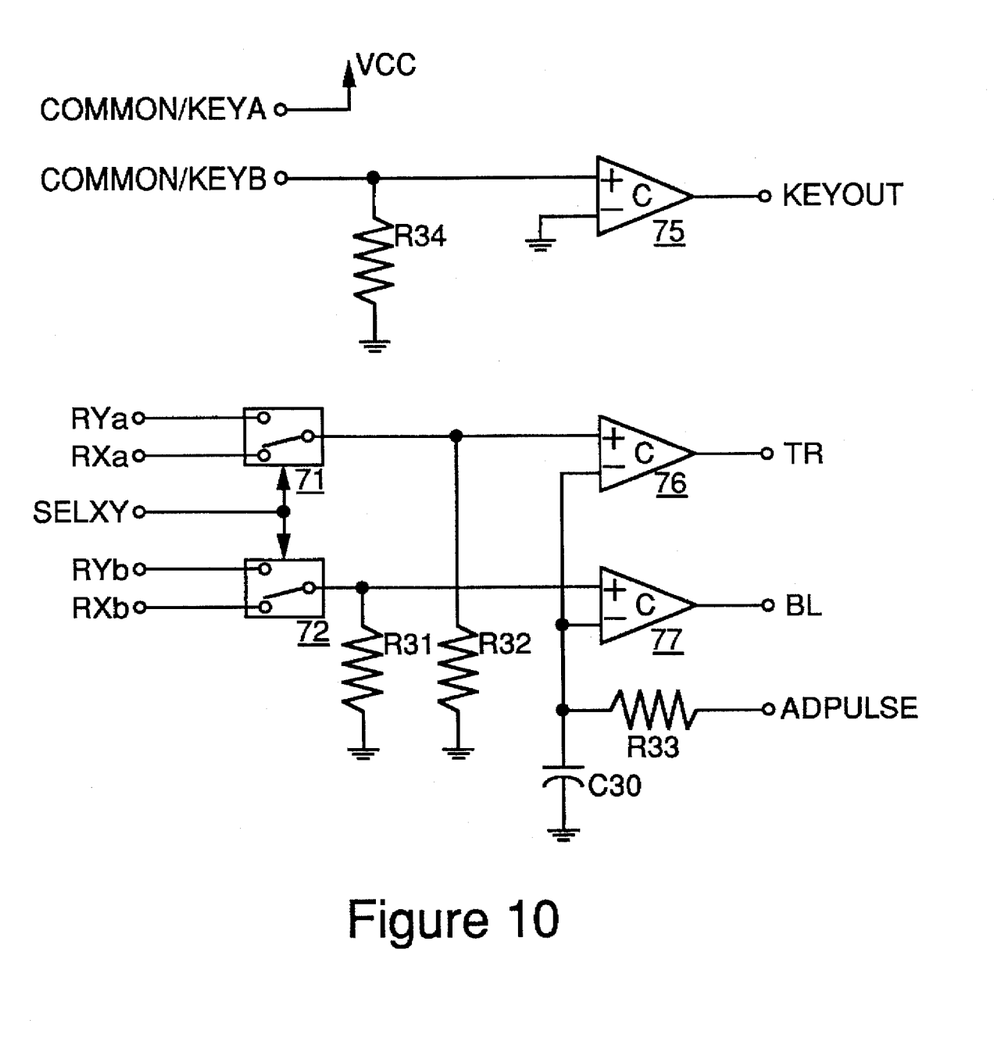
FIG. 10 shows a measurement circuit that may be used to interface the sensor and keyswitch of FIG. 9 to a microcontroller or other instrumentation.

The circuit of FIG. 10 provides an interface to the sensor and keyswitch of FIG. 9. Two analog multiplexers 71 and 72 switch the sensor resistor terminals between an X measurement phase and a Y measurement phase, according to discrete input signal SELXY. Rather than a signed value centered at ½ Vcc, this circuit produces two values: when in the X measurement phase, the TR output represents the right and the BL output represents the left; and when in the Y measurement phase, the TR output represents the top and the BL output represents the bottom. These outputs are positive quantities only, referenced to ground, rather than the signed outputs referenced to ½ Vcc of the previous circuits.

An RC network connects to both comparators 76 and 77, which produce the TR and BL output pulses. In this case, it is possible to weight these measurements according to a compressed or expanded pressure curve, since both the rising and falling curves are available to the ground referenced output signals. Typically, a single X value would be derived from the difference between the TR and BL outputs during the X phase, and similarly for a Y value during the Y phase.

Resistor R34 and comparator 75 monitor the keyswitch state. When the actuator is not pressed down, the keyswitch is open, with the non-inverting input of comparator 75 left at ground, producing a low value at the KEYOUT signal. When the actuator is pressed, the keyswitch is closed, and the non-inverting input of comparator 75 is brought to Vcc, which raises the KEYOUT signal.

It should be appreciated that the present invention as described herein may be modified or adapted in applying the principles of the present invention to different situations.

The actuator may be fabricated from a wide variety of materials, including plastic, metal, or rubber, and may be molded, machined, or produced from other methods. The actuator shaft could be a stick as in a common joystick; a keycap for keyboard integration; a contoured button for comfortable finger use, or many other shapes. The actuator could be made from hard or soft materials, or a combination of these. There may be a central pivot point to restrict motion of the actuator, but this is not always necessary.

There may be a spring to center the actuator or to provide a retarding force acting against the actuator, which would give greater control in producing a desired feel. Such springs could be made from coiled metals or plastic, stamped springs, elastomeric materials, or other materials, and may be placed below or above the actuator. When used with an integrated keyswitch, the spring would prevent the actuator from contacting the sensor unless pressed, and for example could be produced from injection-molded rubber.

The membrane sensor could be produced from a single sheet and folded over for assembly, or it could be produced from several sheets, including rigid materials and deformable materials. Typically deformable materials such as plastic film are preferred, but rigid materials would be appropriate in some instances, especially if the pressure-variable resistor is an elastomeric material.

The sensor could be laminated with adhesive, or simply fit into a molded or machined frame without adhesive. A spacer layer might be required, but not always, and may be printed or otherwise made from sheet material with an aperture. The center of the membrane sensor may be cut or punched to allow for registration or to allow for the central pivot point to pass through the plane of the sensor, but this will not always be desirable, especially when an integrated keyswitch is used.

There are many ways known and commonly practiced in the art for applying conductive and resistive materials onto various substrates, many of which will be suitable for realizing the present invention. These include screen priming, coating, etching, and other forms of deposition. There are many materials suitable for the conductive traces and resistor rings, including polymer thick film inks, but other materials may be used, depending on the fabrication methods used. The pressure-sensitive resistors may likewise be implemented by modifying or top-coating the resistor rings, adding a sheet of pressure-sensitive resistor material, or relying on an area-of-contact effect.

The membrane sensor may be constructed from numerous patterns. The resistor rings do not have to be formed from a circular shape and with constant width, since varying the shape and width may provide a useful bias to the resulting directional signals. In such cases, a non-circular actuator may also be appropriate. There may also be fixed value resistors deposited on the substrate to provide a centering position for the signals. The two resistor rings may be identical in shape, but they may also have some differences. The sensor may be developed with one resistor ring producing the X dimension and the other resistor ring producing the Y dimension, however there may also be a resistor ring producing both dimensions with a common conductor ring on the opposing substrate.

There are a variety of methods of producing an interface circuit for measuring the membrane sensor and providing directional control signals. In most cases, a digital signal is ultimately desired, such as a pulse width or pulse code, but in some cases an analog control signal is appropriate. It will often be preferred for the X and Y directional control signals to be modulated by the pressure, forming a two-dimensional vector, but in some cases it will be desirable to maintain separate direction and magnitude components.

Various methods may be used for measuring the membrane sensor resistances, including voltage dividers based on a constant voltage source, and resistor measurement methods using a current source. The sensor measurement may be a passive network or it may employ active components, such as operational amplifiers and comparators. The resulting directional control signals may be linearly related to the force vector applied to the actuator, but very often it will be desirable to have the directional signals as a nonlinear function of the input force. The directional signals may be normalized or calibrated to some standard, or they may be arbitrarily scaled, and may be signed (bipolar) or unsigned (unipolar) representations. There may be further scaling and nonlinear manipulations of the directional signals in the A/D converters or in software post-processing.

Accordingly, the embodiments described herein should not be taken as a limitation on the scope of the present invention, but rather the invention should only be interpreted in accordance with the following claims.

What is claimed:

1. A joystick for generating directional control signals, said joystick comprising:

first and second insulating substrates, each of said first and second insulating substrates having a first surface region, said first and second insulating substrates being positioned to place said first surface regions of said first and second substrates in spaced apart substantially parallel relationship with one another;

a first resistor defined by a closed-loop conductive pattern on said first surface region of said first insulating substrate;

first and second electrical conductors, said first and second electrical conductors being in electrical contact with said first resistor at spaced apart locations of said closed-loop conductive pattern that defines said first resistor to partition said closed-loop conductive pattern into first and second electrically parallel resistance paths; each of said first and second parallel resistance paths of said first resistor extending between said first and second electrical conductors;

a second resistor defined by a closed-loop conductive pattern of substantially the same geometry as the geometry of said closed-loop conductive pattern that defines said first resistor, said second resistor being located on said first surface region of said second insulating substrate and being in spaced apart substantial spatial registration with said first resistor;

third and fourth electrical conductors, said third and fourth electrical conductors being in electrical contact with said second resistor at first and second spaced apart locations of said closed-loop conductive pattern that defines said second resistor to partition said closed-loop conductive pattern into first and second electrically parallel resistance paths; each of said first and second parallel resistance paths of said second resistor extending between said third and fourth electrical conductors;

a pressure-sensitive resistive material, interposed between said first surfaces of said spaced apart first and second substrates, said pressure-sensitive resistive material exhibiting a resistance value representative of an applied contacting force; and an actuator positioned for operative interaction with one of said first and second insulating substrates, said actuator being radially deflectable to apply a localized pressure on said one of said first and second insulating substrates; said localized pressure acting on said pressure sensitive resistive material to establish a resistive signal path at the location of said localized pressure and extending between said first and second resistors, the resistance of said resistive signal path to thereby establish a first resistance value between said first and second conductors of said first resistor and a second resistance value between said third and fourth conductors of said second resistor, said first and second resistance values being representative of the direction of radial deflection of said actuator.

2. The joystick of claim 1 wherein said pressure sensitive resistive material forms at least one of the closed-loop patterns that defines said first and second resistors so that said signal path between said first and second resistors exhibits a resistance that is representative of the force exerted on the radially deflected actuator.

3. The joystick of claim 1 wherein said pressure sensitive resistive material is deposited on and is in contact with at least one of said first and second resistors, said deposited pressure-sensitive resistive material establishing said resistive signal path between said first and second resistors when said actuator is radially deflected and exhibiting a resistance value representative of the force of radial deflection.

4. The joystick of claim 1 wherein each of said closed-loop conductive patterns that define said first and second resistors are of annular geometry; said first and second conductors are in electrical contact with said conductive pattern that defines said first resistor at diametrically opposed locations; said third and fourth conductors are in electrical contact with said conductive pattern that defines said second resistor at diametrically opposed positions that are circumferentially spaced apart from the electrical contact points of said first resistor by substantially 90°.

5. The joystick of claim 4 wherein at least one of the closed-loop patterns that defines said first and second resistors is formed of said pressure sensitive resistive material so that said signal path between said first and second resistors exhibits a resistance that is representative of the force exerted on said radially deflected actuator.

6. The joystick of claim 4 wherein said pressure sensitive resistive material is deposited on and is in contact with at least one of said first and second resistors, said deposited pressure-sensitive resistive material establishing said resistive signal path between said first and second resistors when said actuator is radially deflected and exhibiting a resistance value representative of the force of radial deflection.

7. The joystick of claim 1 wherein said closed-loop conductive path that defines said first resistor further defines a third resistance path that extends between said first and second conductors and said closed-loop conductive path that defines said second resistor further defines a third resistance path that extends between said third and fourth conductors of said second resistor.

8. The joystick of claim 7 wherein said closed-loop conductive patterns that define said first and second resistors are annular in geometry with said first and second conductors electrically contacting diametrically opposed locations along said closed-loop pattern that defines said first resistor and said third and fourth conductors electrically contacting said second resistor at diametrically opposed locations along said closed-loop pattern that defines said second resistor; and, wherein said third resistance paths of said first and second resistors respectively extend between said first and second conductors and between said third and fourth conductors.

9. The joystick of claim 8 wherein said pressure sensitive resistive material forms at least one of the closed-loop patterns that defines said first and second resistors so that said signal path between said first and second resistors exhibits a resistance that is representative of the force exerted on the radially deflected actuator.

10. The joystick of claim 8 wherein said pressure sensitive resistive material is deposited on and is in contact with at least one of said first and second resistors, said deposited pressure-sensitive resistive material establishing said resistive signal path between said first and second resistors when said actuator is radially deflected and exhibiting a resistance value representative of the force of radial deflection.

11. The joystick of claim 1 further comprising switching means, a voltage source having first and second supply terminals and third and fourth resistors; said third and fourth resistors being connected in series with one another across said voltage source first and second supply terminals, said switching means having a pair of input terminals electrically connected to said first and second conductors of said first resistor and having a pair of input terminals electrically connected to said third and fourth conductors of said second resistor, said switching means having a first operational mode for electrical connection of said voltage source across said first and second conductors of said first resistor and for concurrent electrical connection of said third and fourth conductors of said second resistors to the junction between said serially connected third and fourth resistors; said switching means having a second operational mode for electrical connection of said voltage source across said third and fourth conductors of said second resistor and for concurrent electrical connection of said first and second conductors of said first resistor to the junction between said serially connected third and fourth resistors.

12. A joystick for generating directional control signals comprising first and second insulating substrates, said first insulating substrate having a surface region for containment of a resistive element, said second insulating substrate having a surface region for containment of a conductive element, said first and second insulating substrates being in substantially parallel spaced apart juxtaposition with one another with said surface region of said first insulating substrate facing said surface region of said second insulating substrate;

a first resistor defined by a closed-loop conductive pattern on said surface region of said first insulating substrate; first, second, third and fourth conductors, said first, second, third and fourth conductors electrically connected to spaced apart locations along said closed-loop conductive pattern that defines said first resistor, said first and second conductors partitioning said first resistor into two parallel resistive paths that extend between said first and second conductors, said third and fourth conductors partitioning said first resistor into two resistive paths that extend between said third and fourth conductors;

a conductive pattern of relatively low resistivity deposited on said surface of said second insulating substrate, said conductive pattern being of substantially the same geometry as the geometry of said closed-loop conductive pattern that defines said first resistor;

a fifth conductor electrically connected to said conductive pattern that is located on said surface of said second insulating substrate;

an actuator manually deflectable in a selected direction to establish a resistive signal path between said fifth conductor and a location on said closed-loop conductive pattern that is determined by the direction in which said actuator is deflected; and a pressure-variable resistance material interposed between said first and second substrates, said actuator being radially deflectable to contact one of said first and second substrates, said contact applying a localized pressure on said pressure-variable resistance material to establish said resistive signal path between said fifth conductor and said closed-loop conductive pattern at a resistance value that is representative of the force applied to said actuator.

13. The joystick of claim 12 wherein said closed-loop pattern that defines that first resistor is formed of said pressure-variable resistance material to establish said signal path between said fifth conductor and said closed-loop conductive pattern of said first resistor when said actuator is deflected.

14. The joystick of claim 13 wherein the pressure-variable resistance material is deposited on and is in contact with at least one of said first resistor and said conductive pattern on said surface of said second insulating substrate, said deposited pressure-variable resistance material establishing said resistive signal path between said conductive pattern of said first resistor and said fifth conductor when said actuator is radially deflected, said resistive signal path exhibiting said resistance value representative of the force of said radial deflection.

15. The joystick of claim 12 wherein said closed-loop conductive pattern that defines said first resistor and said conductive pattern on said surface of said second insulating substrate are annular in geometry and wherein said first, second, third and fourth conductors are electrically connected to equally spaced apart points along the circumference of said annular geometry of said first resistor.

16. The joystick of claim 15 wherein said closed-loop pattern said defines that first resistor is formed of a pressure-variable resistance material to establish said signal path between said filth conductor and said closed-loop conductive pattern of said first resistor when said actuator is deflected.

17. The joystick of claim 15 wherein the pressure-variable resistance material is deposited on and is in contact with at least one of said first resistor and said conductive pattern on said surface of said second insulating substrate, said deposited pressure-variable resistance material establishing said resistive signal path between said conductive pattern of said first resistor and said fifth conductor when said actuator is radially deflected, said resistive signal path exhibiting said resistance value representative of the force of said radial deflection.

18. The joystick of claim 12 further comprising:

analog switching means for selectively interconnecting a predetermined voltage between said first and second conductors of said first insulating substrate or said third and fourth conductors of said first insulating substrate; and a current summing amplifier electrically connected to said fifth conductor on said second insulating substrate.

* * * * *